US012581495B2

(12) United States Patent
Abotabl et al.

(10) Patent No.: US 12,581,495 B2
(45) Date of Patent: Mar. 17, 2026

(54) MODE 1 SIDELINK RESOURCE ALLOCATION UNDER NETWORK ENERGY SAVING

(71) Applicant: QUALCOMM Incorporated, San Diego, CA (US)

(72) Inventors: Ahmed Attia Abotabl, San Diego, CA (US); Marwen Zorgui, San Diego, CA (US); Hung Dinh Ly, San Diego, CA (US); Wanshi Chen, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 616 days.

(21) Appl. No.: 18/045,791

(22) Filed: Oct. 11, 2022

(65) Prior Publication Data

US 2024/0121790 A1 Apr. 11, 2024

(51) Int. Cl.
*H04W 72/23* (2023.01)
*H04W 52/02* (2009.01)

(52) U.S. Cl.
CPC ....... *H04W 72/23* (2023.01); *H04W 52/0212* (2013.01)

(58) Field of Classification Search
CPC .............. H04W 72/23; H04W 52/0212; H04L 12/4641; H04L 47/70
See application file for complete search history.

(56) References Cited

U.S. PATENT DOCUMENTS

| | | | | |
|---|---|---|---|---|
| 2022/0361108 A1* | 11/2022 | Zhou | ................. | H04W 72/0446 |
| 2023/0129141 A1* | 4/2023 | Babaei | | |
| 2024/0260129 A1* | 8/2024 | Agiwal | ............... | H04W 72/232 |
| 2024/0340790 A1* | 10/2024 | Zhou | | |
| 2025/0071680 A1* | 2/2025 | Zhou | .................... | H04L 5/0053 |

* cited by examiner

*Primary Examiner* — Sujoy K Kundu
*Assistant Examiner* — Samuel Dilan Rutnam
(74) *Attorney, Agent, or Firm* — Procopio, Cory, Hargreaves & Savitch LLP

(57) ABSTRACT

A method for wireless communication at a user equipment (UE) and related apparatus are provided. In the method, the UE selects a resource for a sidelink transmission based on a network energy-saving (NES) state of a network entity communicating with the UE. The UE further transmits sidelink transmission to another UE using the resource selected based on the NES state of the network entity. The method enables adaptive sidelink resource allocation and configuration in different NES states of the base station. It improves the energy efficiency of wireless communication.

30 Claims, 11 Drawing Sheets

500

502 504

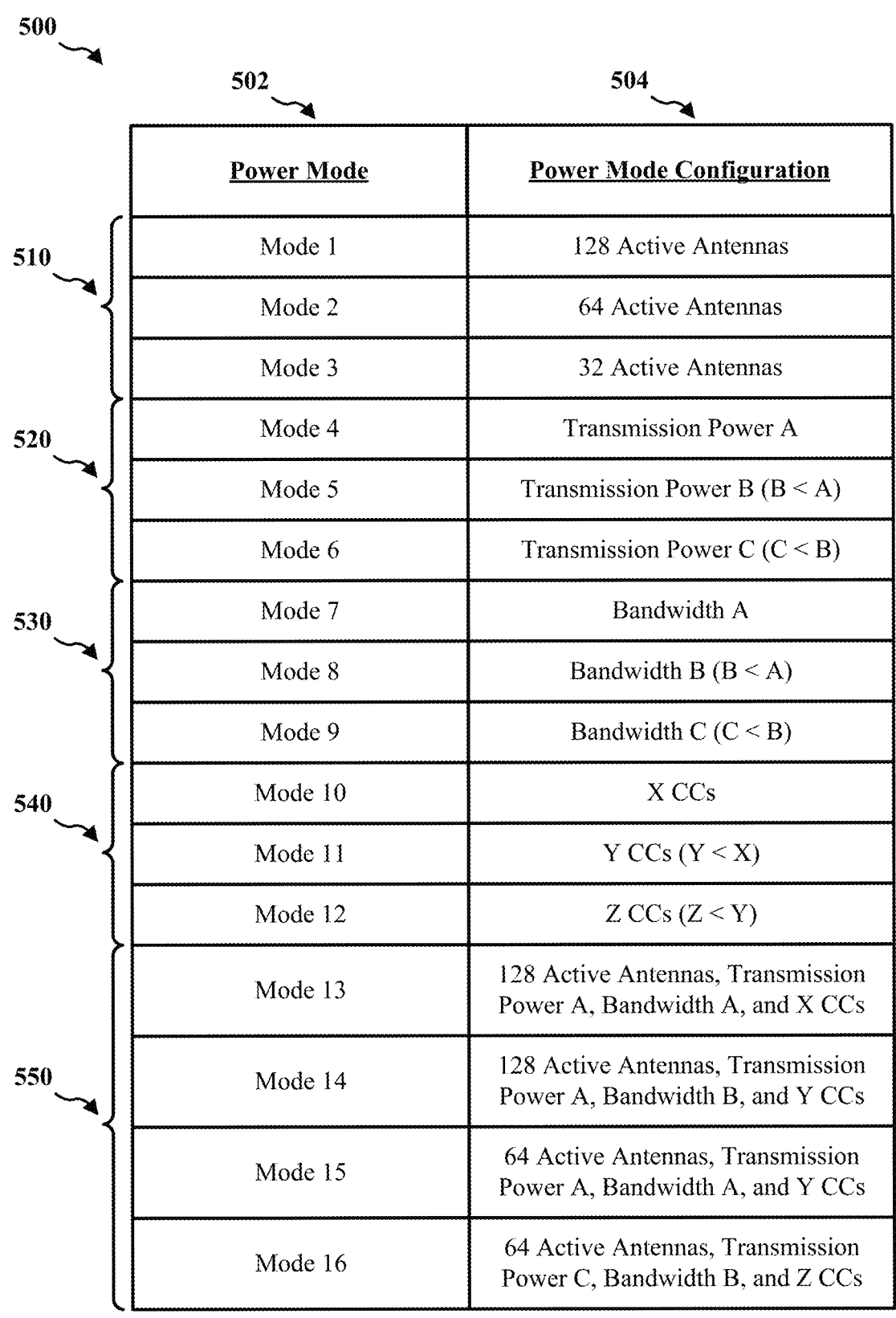

| Power Mode | Power Mode Configuration |
| --- | --- |
| Mode 1 | 128 Active Antennas |
| Mode 2 | 64 Active Antennas |
| Mode 3 | 32 Active Antennas |
| Mode 4 | Transmission Power A |
| Mode 5 | Transmission Power B (B < A) |
| Mode 6 | Transmission Power C (C < B) |
| Mode 7 | Bandwidth A |
| Mode 8 | Bandwidth B (B < A) |
| Mode 9 | Bandwidth C (C < B) |
| Mode 10 | X CCs |
| Mode 11 | Y CCs (Y < X) |
| Mode 12 | Z CCs (Z < Y) |
| Mode 13 | 128 Active Antennas, Transmission Power A, Bandwidth A, and X CCs |
| Mode 14 | 128 Active Antennas, Transmission Power A, Bandwidth B, and Y CCs |
| Mode 15 | 64 Active Antennas, Transmission Power A, Bandwidth A, and Y CCs |
| Mode 16 | 64 Active Antennas, Transmission Power C, Bandwidth B, and Z CCs |

802 select a resource for a sidelink transmission based on a network energy saving (NES) state of a network entity communicating with the first UE

804 transmit sidelink transmission to a second UE using the resource selected based on the NES state of the network entity

800

900

902 indicate, to a first user equipment (UE), a network energy saving (NES) state of the network entity for the first UE to select, based on the NES state, a resource for a sidelink communication between the first UE and a second UE

904 receive, from the first UE, feedback for the sidelink communication of the first UE based on the NES state of the network entity

MODE 1 SIDELINK RESOURCE ALLOCATION UNDER NETWORK ENERGY SAVING

TECHNICAL FIELD

The present disclosure relates generally to communication systems, and more particularly, to wireless communication with sidelink resource allocation.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a first user equipment (UE). The apparatus may include memory; and at least one processor coupled to the memory and configured to select a resource for a sidelink transmission based on a network energy-saving (NES) state of a network entity communicating with the first UE; and transmit sidelink transmission to a second UE using the resource selected based on the NES state of the network entity.

In an aspect of the disclosure, a method, a computer-readable medium, and an apparatus are provided for wireless communication at a network entity. The apparatus may include memory; and at least one processor coupled to the memory and configured to indicate, to a first user equipment (UE), an NES state of the network entity for the first UE to select, based on the NES state, a resource for a sidelink communication between the first UE and a second UE; and receive, from the first UE, feedback for the sidelink communication of the first UE based on the NES state of the network entity.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 5 is a diagram illustrating an example table of power mode configurations corresponding to different power modes.

DETAILED DESCRIPTION

Figure 1:
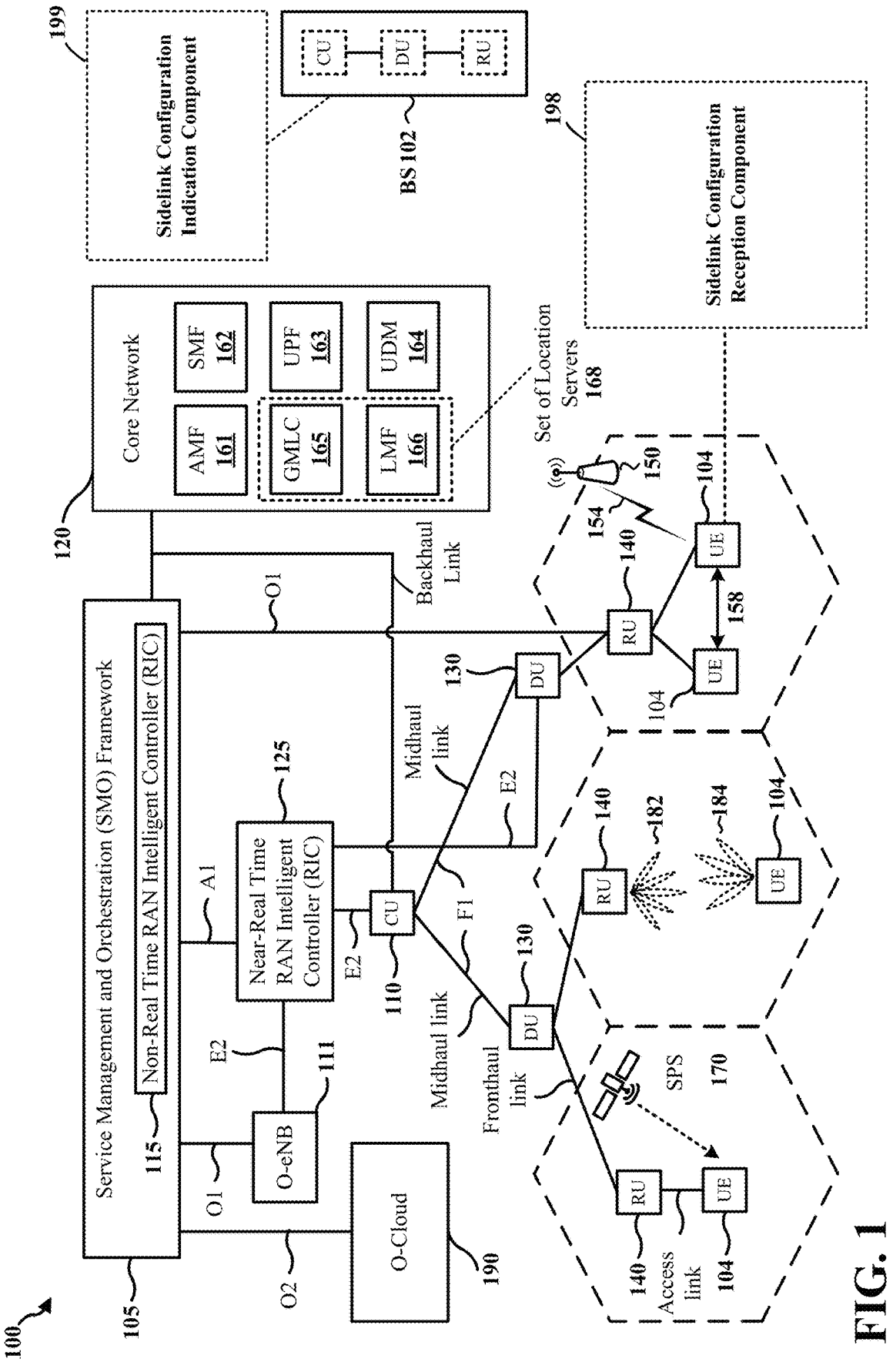
FIG. 1 is a diagram illustrating an example of a wireless communications system and an access network.

Operating a cellular network is associated with high network energy consumption. Aspects presented herein provide for wireless communication in connection with network energy-saving features. This disclosure provides a method for wireless communication at a first UE. The method may include selecting a resource for a sidelink transmission based on an NES state of a network entity communicating with the first UE; and transmitting sidelink transmission to a second UE using the resource selected based on the NES state of the network entity. The method enables adaptive sidelink resource allocation and configuration in different NES states of the base station. It improves the energy efficiency of wireless communication.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit—User Plane (CU-UP)), control plane functionality (i.e., Central Unit—Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration.

The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface).

For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH), e.g., which may include sidelink control information (SCI). D2D communication may be through a variety of wireless D2D communications systems, such as for example, Bluetooth, Wi-Fi based on the Institute of Electrical and Electronics Engineers (IEEE) 802.11 standard, LTE, or NR.

Figure 4:
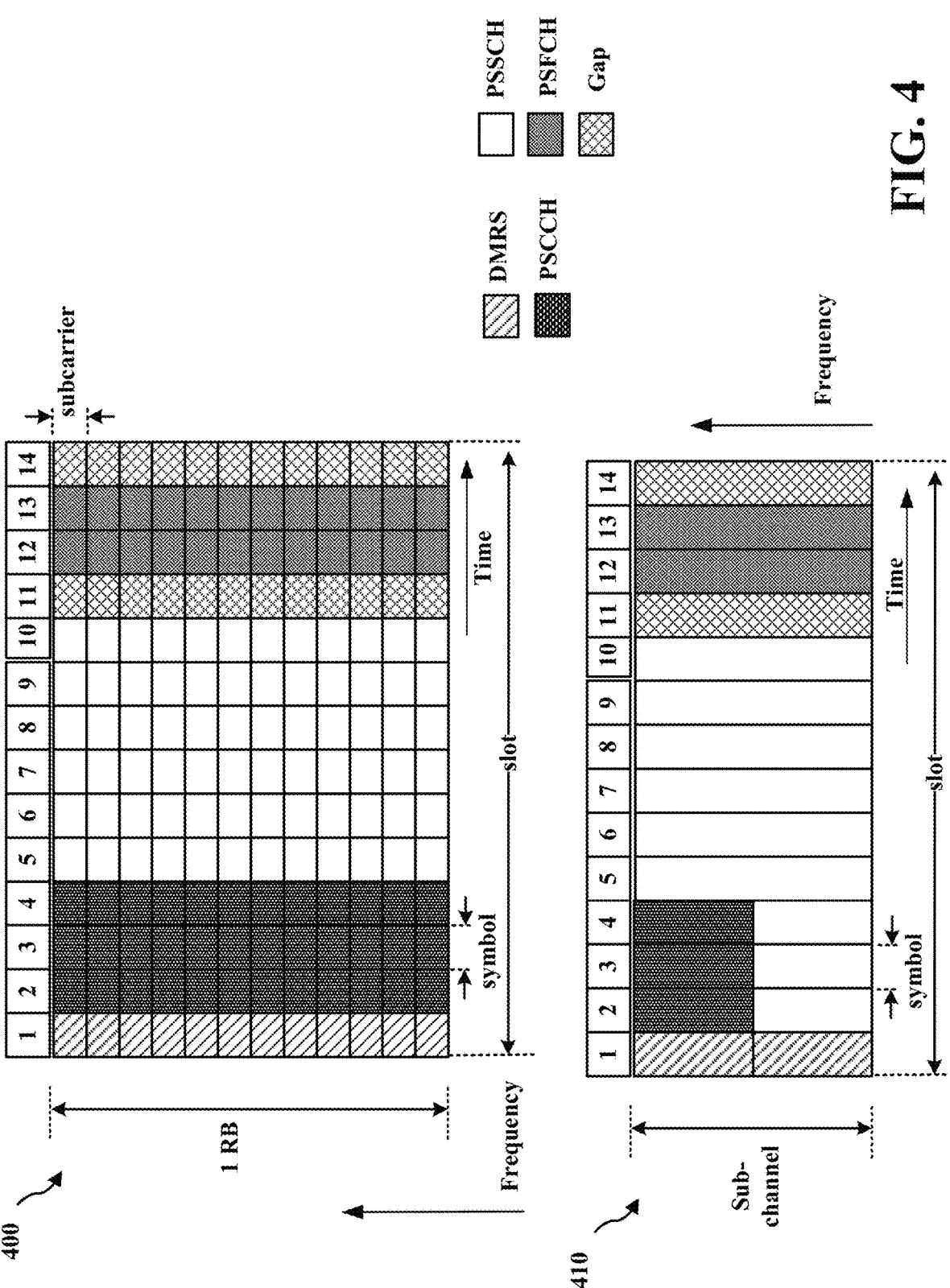
FIG. 4 are diagrams illustrating example aspects of slot structures for sidelink communication.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU), etc. Sidelink communication may be exchanged using a PC5 interface, in some aspects. FIG. 4 illustrates an example slot structure that may be used for sidelink communication. Although the example slot structure of FIG. 4, may provide example aspects for sidelink communication in connection with 5G NR, the concepts described herein may be applicable to other similar areas, such as LTE, LTE-A, CDMA, GSM, and other wireless technologies.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/ actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a sidelink configuration reception component 198. The sidelink configuration component 198 may be configured to select a resource for a sidelink transmission based on an NES state of a network entity communicating with the first UE; and transmit sidelink transmission to a second UE using the resource selected based on the NES state of the network entity. In certain aspects, the base station 102 may include a sidelink communication indication component 199. The sidelink communication indication component 199 may be configured to indicate, to the first UE, the NES state of the network entity for the first UE to select, based on the NES state, a resource for a sidelink communication between the first UE and a second UE; and receive, from the first UE, feedback for the sidelink communication of the first UE based on the NES state of the network entity. Although the following description may be focused on 5G NR, the concepts described herein may be applicable to other similar areas, such as LTE, LTE-A, CDMA, GSM, and other wireless technologies.

Figures 2A, 2B, 2C, 2D:
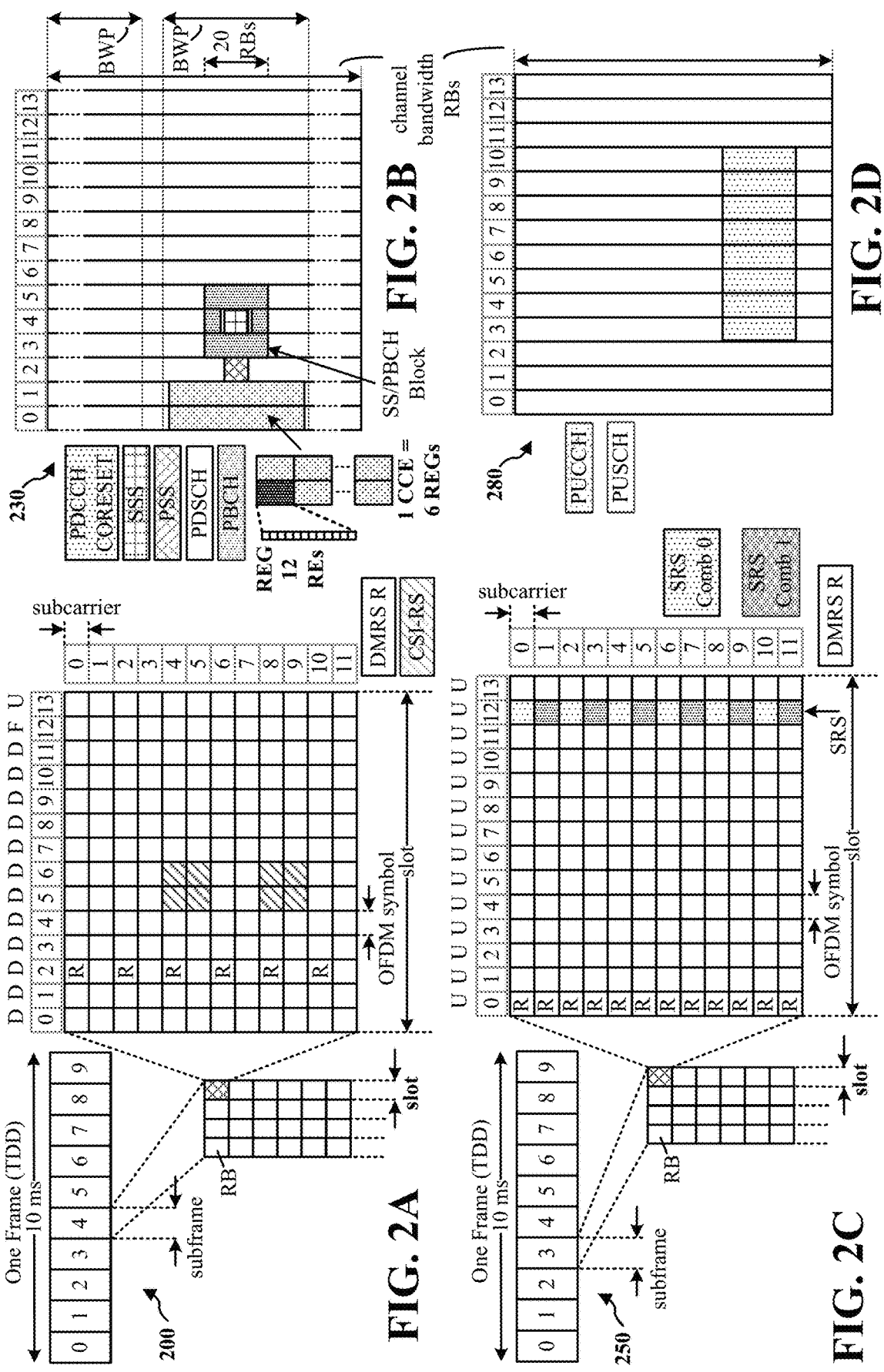
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
|---|---|---|
| $\mu$ | SCS $\Delta f = 2^{\mu} \cdot 15$[kHz] | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu} \ast 15$ kHz, where $\mu$ is the numerology 0 to 4. As such, the numerology $\mu=0$ has a subcarrier spacing of 15 kHz and the numerology 1.1=4 has a subcarrier spacing of 240 kHz. The symbol length/ duration is inversely related to the subcarrier spacing. FIGS. 2A-2D provide an example of normal CP with 14 symbols per slot and numerology 1.1=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
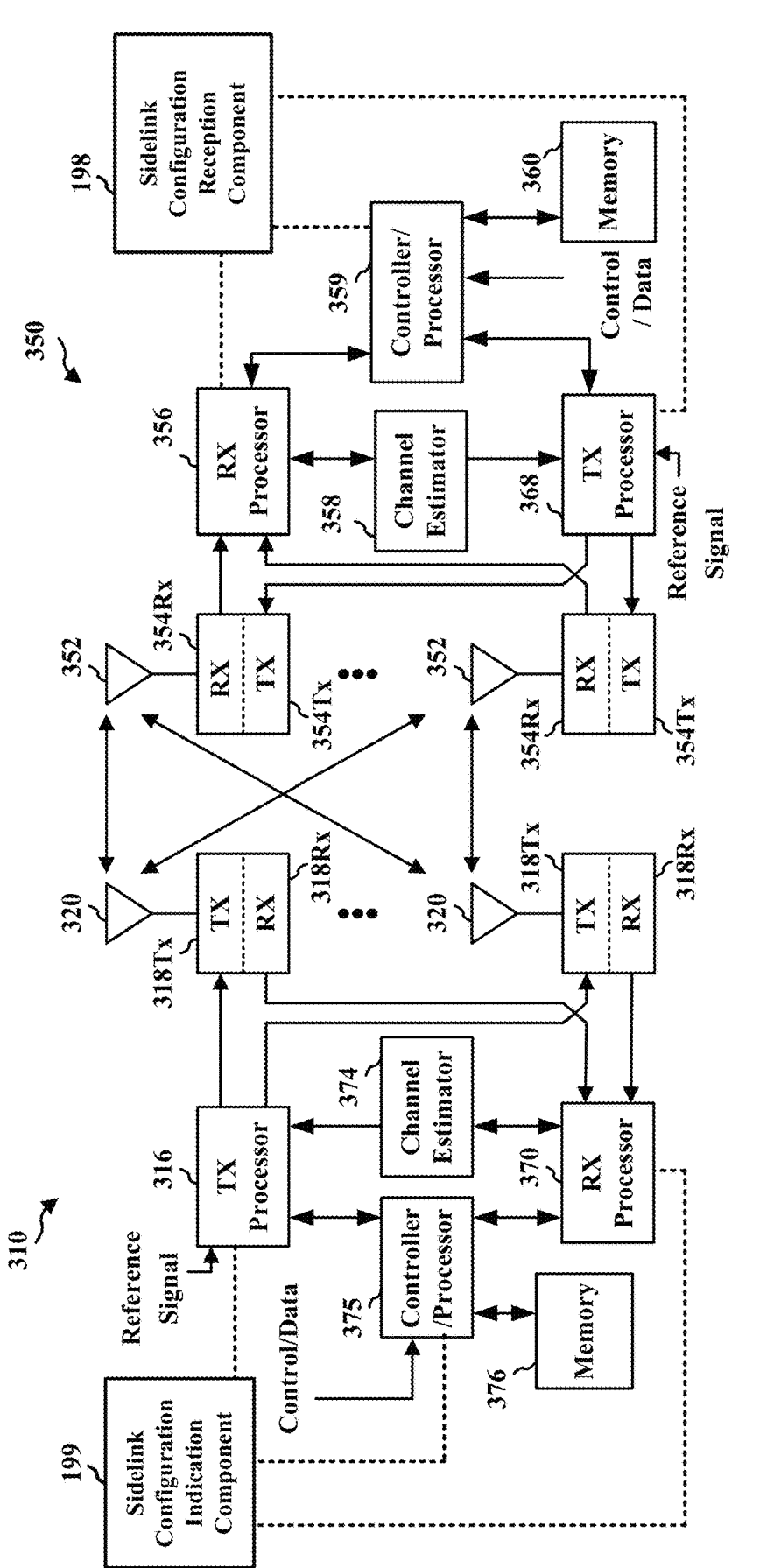
FIG. 3 is a diagram illustrating an example of a base station and user equipment (UE) in an access network.

FIG. 3 is a block diagram of a first wireless communication device 310 in communication with a second wireless communication device 350. In some aspects, the wireless communication may be based on an access link, e.g., a Uu connection. In some aspects, the wireless communication may be based on sidelink, such as using a PC5 interface. In some aspects, the device 310 may be a base station in communication with a UE (e.g., device 350) in an access network. In some examples, the devices 310 and 350 may communicate based on sidelink communication, such as V2X, or other D2D communication. As an example, the device 350 may be a UE, and the device 310 may comprise a second UE, an RSU, a base station, etc.

In DL examples, Internet protocol (IP) packets may be provided to a controller/processor 375, for example. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318Tx. Each transmitter 318Tx may modulate a radio frequency (RF) carrier with a respective spatial stream for transmission.

At the device 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the device 310. These soft decisions may be based on channel estimates computed by the channel estimator 358. The soft decisions are then decoded and deinterleaved to recover the data and control signals that were originally transmitted by the device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the device 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the device 310 may be used by the TX processor 368 to select the appropriate coding and modulation schemes, and to facilitate spatial processing.

The spatial streams generated by the TX processor 368 may be provided to different antenna 352 via separate transmitters 354Tx. Each transmitter 354Tx may modulate an RF carrier with a respective spatial stream for transmission.

The UL transmission is processed at the device 310 in a manner similar to that described in connection with the receiver function at the device 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the sidelink configuration reception component 198 of FIG. 1.

At least one of the TX processor 316, the RX processor 370, and the controller/processor 375 may be configured to perform aspects in connection with the sidelink configuration indication component 199 of FIG. 1.

FIG. 4 includes diagrams 400 and 410 illustrating example aspects of slot structures that may be used for sidelink communication (e.g., between UEs 104, an RSU, etc.). The slot structure may be within a 5G/NR frame structure, in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 4 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 400 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 410 in FIG. 4 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 4, some of the REs may include control information in PSCCH and some REs may include demodulation RS (DMRS). At least one symbol may be used for feedback. FIG. 4 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 4. Multiple slots may be aggregated together in some aspects.

A UE may transmit a sidelink transmission comprising a control channel (e.g., PSCCH) and/or a corresponding data channel (e.g., PSSCH), that may be received by one or more UEs, e.g., received directly from the transmitting UE rather than via a base station. A control channel may include information (e.g., sidelink control information (SCI)) for decoding the data channel including reservation information, such as information about time and/or frequency resources that are reserved for the data channel transmission.

Sidelink communication may be based on different types or modes of resource allocation mechanisms. In a first resource allocation mode (which may be referred to herein as "Mode 1"), centralized resource allocation may be provided by a network entity. For example, a base station 102 may determine resources for sidelink communication and may allocate resources to different UEs 104 to use for sidelink transmissions. In this first mode, a UE receives the allocation of sidelink resources from the base station 102. In a second resource allocation mode (which may be referred to herein as "Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. Devices communicating based on sidelink, may determine one or more radio resources in the time and frequency domain that are used by other devices in order to select transmission resources that avoid collisions with other devices. The sidelink transmission and/or the resource reservation may be periodic or aperiodic, where a UE may reserve resources for transmission in a current slot and up to two future slots (discussed below).

Thus, in the second mode (e.g., Mode 2), individual UEs may autonomously select resources for sidelink transmission, e.g., without a central entity such as a base station indicating the resources for the device. A first UE may reserve the selected resources in order to inform other UEs about the resources that the first UE intends to use for sidelink transmission(s). In some examples, the resource selection for sidelink communication based on the Mode 2 resource allocation may be based on a sensing-based mechanism. For instance, before selecting a resource for a data transmission, a UE may first determine whether resources have been reserved by other UEs. The UE may exclude resources that are used and/or reserved by other UEs from a set of candidate resources for sidelink transmission by the UE, and the UE may select/reserve resources for a sidelink transmission from the resources that are unused and therefore form the set of candidate resources. The UE may continuously perform sensing for SCI with resource reservations in order to maintain a set of candidate resources from which the UE may select one or more resources for a sidelink transmission. Once the UE selects a candidate resource, the UE may transmit SCI indicating its own reservation of the resource for a sidelink transmission.

A network node (e.g., a network entity, such as a base station) may have different modes of operation associated with different configuration parameters that may provide tradeoffs between aspects of the network node, such as performance, coverage, power savings, etc. For example, a power mode, sometimes referred to as a "power saving mode" herein, is a mode of operation of a network node that enables the network node to conserve power resources while maintaining wireless communication. The network node may adjust one or more of its configuration parameters to operate in the power mode. Examples of configuration parameters related to operating in the power mode may include resources that increase or decrease the ability of the network node to receive (or obtain) a communication or to transmit (or output) a communication. For example, configuration parameters may include a number of active antennas, a bandwidth, a transmission power, a number of active CCs, a number of layers, a number of inactive symbols in a slot, as well as other parameters.

In some examples, a network node may be configured with different power modes that have tradeoffs between different aspects, such as between power saving and performance. FIG. 5 illustrates an example table 500 of power mode configurations 504 corresponding to different power modes 502, as presented herein. As shown in FIG. 5, the different power modes may be associated with different power mode configurations. As an example, in a first power mode, a network node may transmit and/or receive communication using 128 antennas. In a second power mode, the network node may transmit and/or receive communication using a reduced set of antennas, such as 64 antennas. In a third power mode, the network node may transmit and/or receive communication using a further reduced set of antennas, such as 32 antennas. As shown in FIG. 5, a first power modes subset 510 illustrate examples of multiple power mode configurations based on a number of active antennas. The power mode configurations 504 may also include other parameters that are the same or different between respective power modes of the first power modes subset 510, for example, beyond the number of active antennas. For example, while the power modes of the first power modes subset 510 are associated with different numbers of active antennas, two or more of the respective power modes may be associated with a same or different bandwidth, a same or different transmission power, a same or different number of active CCs, a same or different number of layers, a same or different number of inactive symbols in a slot, etc.

As another example of power mode configurations, the network node may reduce transmission power in one or more power modes in order to conserve power. For example, in a fourth power mode of the table 500, the network node may use a first transmission power for transmitting communications. In a fifth power mode of the table 500, the network node may transmit communications using a reduced transmission power. Similar to the example for power mode configurations with reduced sets of active antennas, the network node may be configured with additional power modes with further reduced transmission power. As shown in FIG. 5, a second power modes subset 520 illustrates examples of multiple power mode configurations based on transmission power. Similar to the example of the power mode configurations 504 of the first power modes subset 510, the power mode configurations associated with the power modes of the second power modes subset 520 may also include other parameters that are the same or different between respective power modes of the second power modes subset 520, for example, beyond the transmission power.

As another example of power mode configurations, the network node may operate based on a reduced bandwidth in one or more power modes in order to conserve power. For example, in a seventh power mode of the table 500, the network node may use a first bandwidth for communication with one or more other network nodes. In an eight power mode of the table 500, the network node may use a reduced bandwidth for communication with the one or more other network nodes. Similar to the example for power mode configurations with a reduced set of active antennas, the network node may be configured with additional power modes with further reduced bandwidth. As shown in FIG. 5, a third power modes subset 530 illustrates examples of multiple power mode configurations based on bandwidth. Similar to the example of the power mode configurations 504 of the first power modes subset 510, the power mode configurations associated with the power modes of the third power modes subset 530 may also include other parameters that are the same or different between respective power modes of the third power modes subset 530, for example, beyond the network bandwidth.

As another example of power mode configurations, the network node may operate based on a reduced number of component carriers in one or more power modes in order to conserve power. For example, in a tenth power mode of the table 500, the network node may provide, or use, a number of component carriers (CCs) for communication with one or more other network nodes. In an eleventh power mode of the table 500, the network node may provide, or use, a reduced number of CCs for communication with the one or more other network nodes. Similar to the example for power mode configurations with a reduced set of antennas, the network node may be configured with additional power modes with further reduced numbers of CCs. As shown in FIG. 5, a fourth power modes subset 540 illustrates examples of multiple power mode configurations based on a number of CCs. Similar to the example of the power mode configurations 504 of the first power modes subset 510, the power mode configurations associated with the power modes of the fourth power modes subset 540 may also include other parameters that are the same or different between respective power modes of the fourth power modes subset 540, for example, beyond the number of CCs.

In the illustrated example of FIG. 5, the table 500 includes a fifth power modes subset 550 that illustrates examples in which the power mode configurations may include a combination of parameters to illustrate the concept of different power mode configurations associated with different power modes. A power mode configuration may include any combination of parameters that affect power consumption at the network node, and is not limited to the examples of the table 500 of FIG. 5.

The examples illustrated in the table 500 of FIG. 5 are merely to illustrate the concept of power mode configurations associated with different power modes. The concepts presented herein apply to additional examples of power mode configurations.

Network nodes in communication may switch between different power modes. For example, a network node may be in communication with a UE and the network node may switch from operating in the first power mode to the third power mode. In such examples, the third power mode may be referred to as the active power mode of the network node.

Figures 6A, 6B:
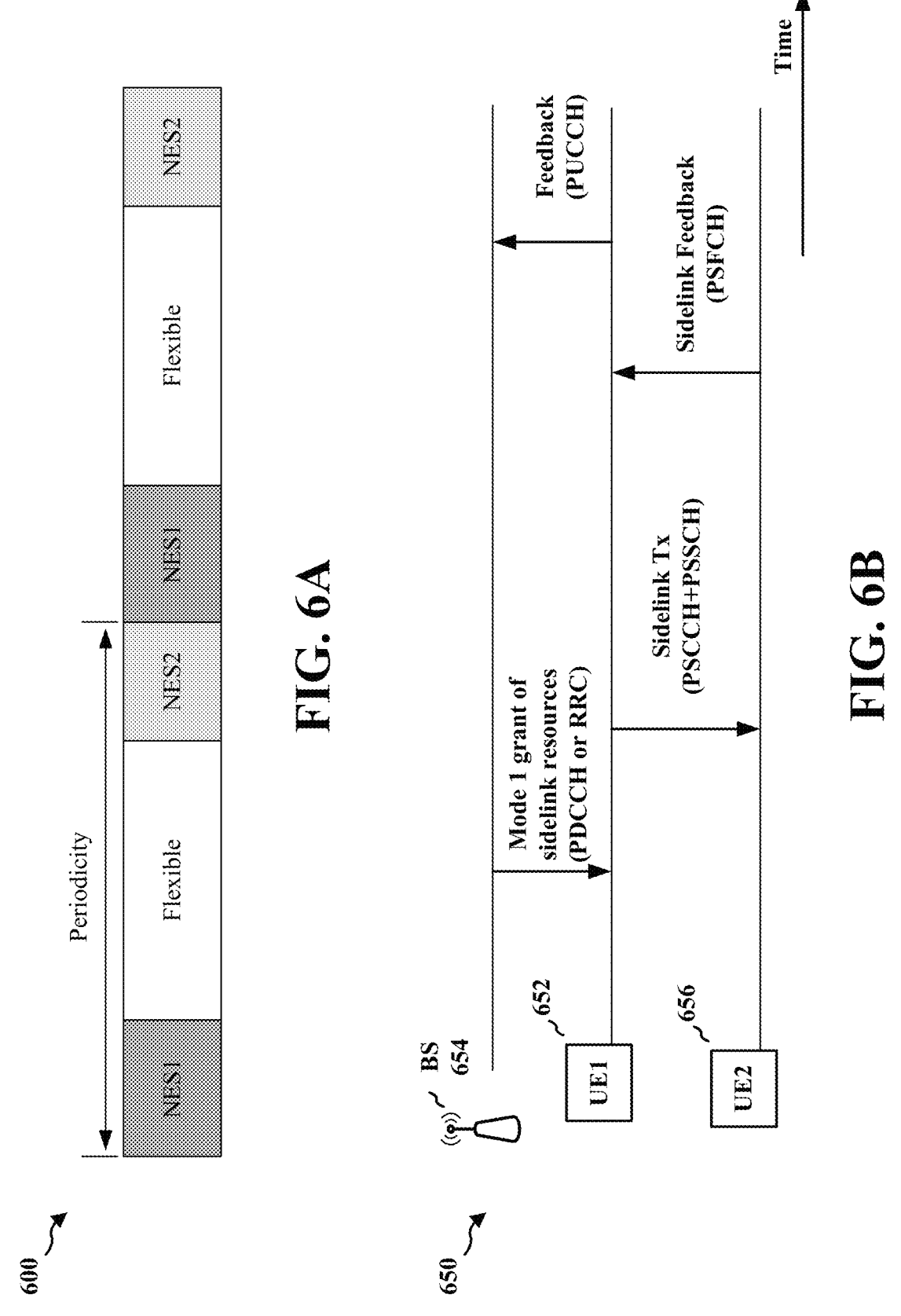
FIG. 6A is a diagram illustrating a network entity operating under various network energy-saving states.
FIG. 6B illustrates an example of mode 1 resource allocation for sidelink communication.

A network entity may have a semi-static approach for network operation for network energy-saving purposes. FIG. 6A is a diagram 600 illustrating a network entity operating under various network energy-saving states. As shown in FIG. 6A, NES1 may be one network energy-saving (NES) state, and NES2 may be another network energy-saving state. FIG. 6A illustrates that a network entity may change between the NES states, and in some aspects, may change between the NES states based on a semi-static pattern.

An NES state may refer to a specific operation by the network entity that saves energy. A flexible state may refer to a state that stays flexible and may be dynamically indicated by the network depending on the current wireless traffic conditions for the network. One state may be a non-energy saving state, which represents a normal or baseline network operation. As an example, an NES state may be one of the power modes shown in the example table in FIG. 5.

A network entity or a base station may change to different NES states based on the traffic conditions. When the network decides to reduce its capability in terms of the number of Tx antenna ports, for example, another base station may increase its coverage to overcome this coverage change. The coverage change may also change the optimization in connection with the selection for a UE between Mode 1 and Mode 2 sidelink resource allocation. For example, if a network enters into a sleep mode, the network-controlled resources (e.g., sidelink resources assigned by Mode 1 allocation from the network) may be reduced for energy-saving purposes. In Mode 1, the base station may be heavily involved in granting resources for the sidelink communication. FIG. 6B illustrates an example of mode 1 resource allocation 650. For example, the base station 654 may transmit dynamic grants (DG) of sidelink resources in a PDCCH and/or may provide configured grants of sidelink resources in RRC signaling to the UE 652. The UE transmits sidelink communication to a second UE 656 using the allocated resources. The second UE 656 provides feedback to the first UE 652 for the sidelink transmission. The UE 652 may then provide feedback to the base station, e.g., informing the base station whether the UE 652 was able to successfully transmit the sidelink communication on the allocated resources. The base station may receive feedback from the UE about the use of the allocated resources.

The present disclosure presents methods and apparatus for the adaptation of sidelink resource allocation and configuration based on different NES states in which the base station operates.

In some aspects, for a subset of NES states, the Mode 1 resource allocation behavior for sidelink communication may be different than for other NES states of the base station.

In some aspects, a UE may not expect to receive a dynamic grant in (e.g., in on DCI format 3_0) based on an NES of the base station. In such examples, the UE may skip monitoring for DCI format 3_0 with an allocation of sidelink resources if the UE is aware that the base station is in a particular NES state.

For configured grant Type 1 (e.g., in which the configured grant is provided through RRC configuration and can be used without further activation in a MAC-CE), the UE may, based on the NES state of a base station that provided the configured grant, release (e.g., stop using) or deactivate (e.g., temporarily put on hold) all or a subset of the configured grant Type 1 resource allocations. For configured grant Type 2 (e.g., in which a configured grant is RRC configured and is activated/deactivated by MAC-CE), the UE may assume an implicit deactivation of the configured grant (CG) if the base station changes to a particular NES state, e.g., to one of the subset of NES states.

In some aspects, the UE may release or deactivate all of the configured grant(s) that the UE received from the base station for sidelink communication in response to the base station changing to an NES state from the subset of NES states.

In other aspects, the UE may release or deactivate a portion of the configured grant(s) in response to the base station changing to an NES state from the subset of NES states.

The portion of the CG to be released or deactivated may be determined based on various factors. These factors may include, but are not limited to, an RRC configuration, the periodicity of the CG, and/or the priority of the sidelink information. In one example, an RRC configuration may include one or more NES states associated with the releasing or deactivating of the CG. When a base station enters one of these NES states, at least a portion of the CG may be deactivated or released. In another example, the portion of the CG that has a low periodicity (e.g., in terms of the number of grants per slot) may be retained if the periodicity is lower than a periodicity threshold. The periodicity threshold may be RRC configured or may be known by the UE such as a defined periodicity threshold.

Different NES states of a network entity may lead to the reduced signal-to-interference-plus-noise ratio (SINR) due to reduced beamforming gain that results from the reduced number of antennas. Therefore, the sidelink CG parameters may adapt accordingly. The sidelink CG configuration may be adjusted according to the NES states in various ways. In one configuration, a UE may be configured with multiple sidelink CG configurations, each corresponding to one of the possible NES states. Once the base station moves from a previous NES state to a new NES state, the UE may deactivate the CG corresponding to the previous NES and activate the CG corresponding to the new (e.g., current) NES state of the base station that provided the CG configurations. In another configuration, the UE may be configured with one CG configuration (the initial CG configuration), and the UE may be additionally configured with multiple adaptation offsets (or adaptation configurations), each corresponding to one of the possible NES states of the base station that provided the configurations. Each of the multiple adaptation offsets may indicate, when the base station enters a new NES state, an adjustment to one or more configuration parameters in the CG configuration corresponding to the new NES state with the corresponding parameters in the initial CG configuration. For example, the adaptation offset (or adaptation configuration) corresponding to a new NES state may indicate an adjustment to one or more of time resources, frequency resources, the transmission power for the sidelink transmission, and/or an MCS of the sidelink transmission with respect to the corresponding parameters in the initial CG configuration when the network entity moves from the initial NES state (corresponding to the initial CG configuration) to the new NES state.

The UE may provide feedback for the sidelink CG under various NES states. For a CG, the UE may report ACK to a base station if the UE does not have data to transmit in a transmission occasion of the CG. Depending on the NES state a network entity enters, the network may turn off one or both UL and DL communications. In one example, a network entity may get into an NES state (or sleep mode) that turns off the DL communication while maintaining the UL since the DL power consumption is more dominant. In another example, a network entity may get into other states that save energy in both DL and UL directions, which means the network does not transmit a DL signal or receive a UL signal.

Feedback behaviors for the UE may be different depending on the NES states. In one configuration, for certain NES states of the base station (e.g., the NES states that do not allow UL communication), the UE may not transmit (e.g., may skip transmit of) feedback relating to a mode 1 resource allocation to the base station. For other NES states of the base station (e.g., the NES states that allow UL communication), the UE may transmit HARQ/ACK feedback for the CG to the base station. In one configuration, the UE may defer the feedback until the network enters an NES state that allows for feedback for mode 1 resource allocation. For example, when the current state of the base station does not allow for reception of UL communication, the UE may defer the feedback until a later time, when the base station is in an energy state in which it receives a UL transmission. The amount of deferral may be controlled by the latest N transmission in the NES state, where N is a positive integer value. N may be RRC configured or may be a known or defined value.

Figure 7:
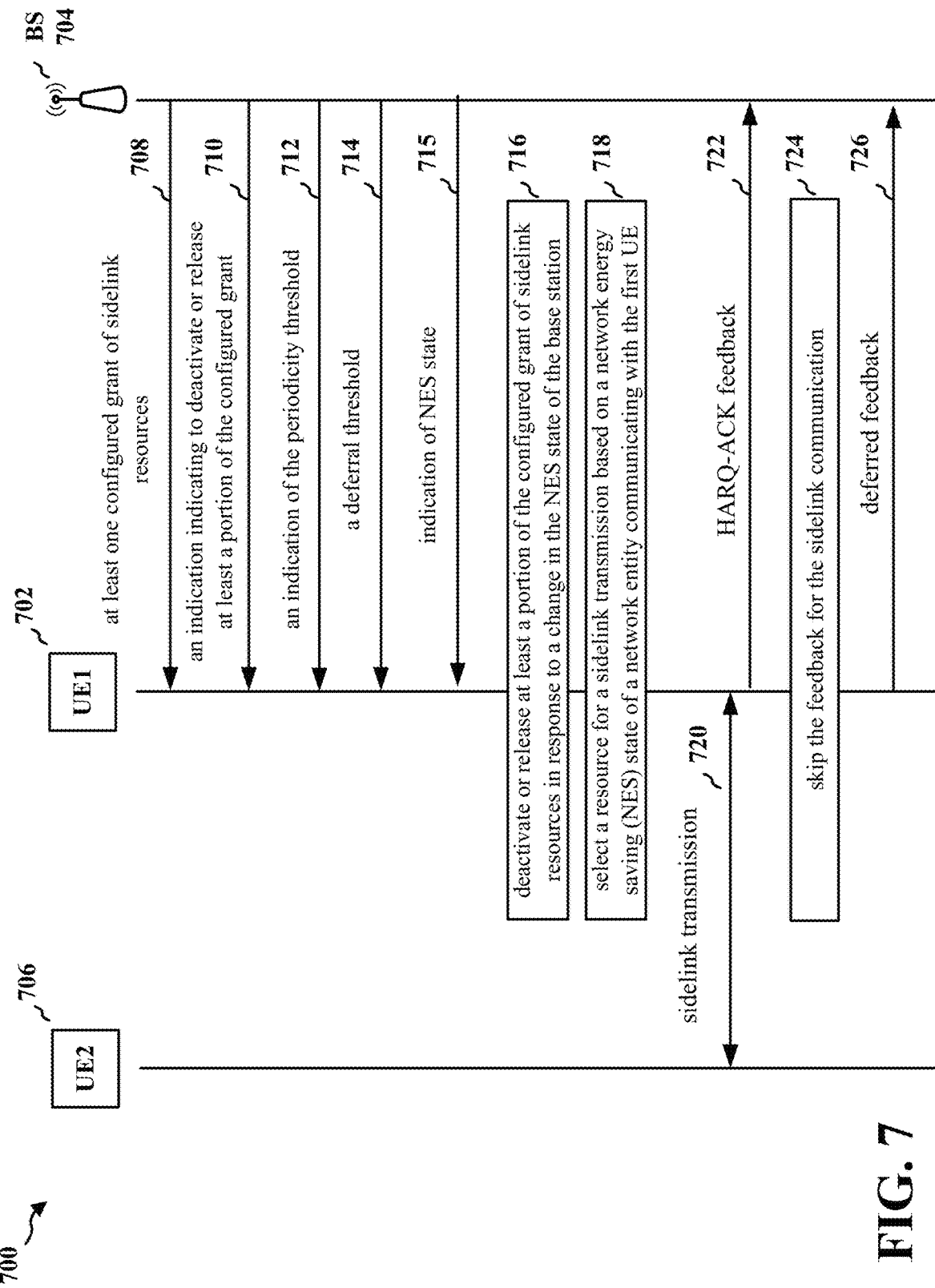
FIG. 7 is a call flow diagram illustrating a method of wireless communication in accordance with various aspects of the present disclosure.

FIG. 7 is a call flow diagram 700 illustrating a method of wireless communication in accordance with various aspects of this present disclosure. Although aspects are described for a base station 704, the aspects may be performed by a base station in aggregation and/or by one or more components of a base station 704 (e.g., such as a CU 110, a DU 130, and/or an RU 140).

As shown in FIG. 7, at 708, a first UE (UE1) 702 may receive, at least one configured grant of sidelink resources from a base station 704. The sidelink resources may be for the sidelink communication between the first UE 702 and the second UE (UE2) 706.

At 710, the first UE 702 may further receive an indication, e.g., such as a MAC-CE indicating to deactivate or release at least a portion of the configured grant from the base station 704.

At 712, the first UE 702 may further receive an indication of the periodicity threshold from the base station 704. In one configuration, the first UE 702 may use the periodicity threshold to determine the portion of the sidelink resource to be released or deactivated.

At 714, the first UE 702 may receive a deferral threshold from the base station 704. In one configuration, the first UE 702 may determine whether deferred feedback needs to be transmitted to the base station 704 based on the deferral threshold.

At 715, the UE may receive an indication of an NES state of the base station 704. For example, the UE may receive an indication of a change in the NES state, or a semi-static pattern of NES states.

At 716, the first UE 702 may deactivate or release at least a portion of the configured grant of sidelink response in response to a change in the NES state of the base station 704.

At 718, the first UE 702 may select a resource for a sidelink transmission based on an NES state of the base station 704.

At 720, using the selected resource for the sidelink transmission, the UE 702 may transmit sidelink transmission to the second UE 706.

At 722, the first UE 702 may transmit HARQ-ACK feedback regarding the sidelink transmission to the base station 704.

At 724, in one configuration, the first UE 702 may skip the feedback for the sidelink communication depending on the NES state of the base station 704.

At 726, the first UE 702 may send deferred feedback regarding the sidelink communication to the base station 704 if the first UE 702 skipped one or more feedback at 724.

Figure 8:
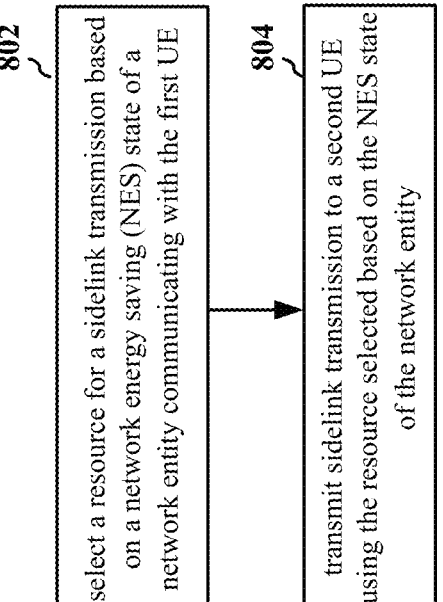
FIG. 8 is a flowchart illustrating methods of wireless communication at a UE in accordance with various aspects of the present disclosure.

FIG. 8 is a flowchart 800 illustrating methods of wireless communication at a first UE in accordance with various aspects of the present disclosure. The method may be performed by a first UE. The first UE may be the UE 104, 702; wireless device 350; or the apparatus 1004 in the hardware implementation of FIG. 10. The method enables adaptive sidelink resource allocation and configuration in different NES states of the base station. It improves the energy efficiency of wireless communication.

As shown in FIG. 8, at 802, the first UE may select a resource for a sidelink transmission based on an NES state of a network entity communicating with the first UE. The network entity may be a base station, or a component of a base station, in the access network of FIG. 1 or a core network component (e.g., base station 102; base station 704; wireless device 310; or the network entity 1002 in the hardware implementation of FIG. 10). FIGS. 4, 5, 7 illustrate various aspects of the steps in connection with flowchart 800. For example, referring to FIG. 7, the first UE 702 may select, at 718, a resource for a sidelink transmission based on an NES state of a network entity (base station 704) communicating with the first UE 702. In one configuration, the resource for the sidelink transmission may refer to the frequency domain resource and time domain resource illustrated by the slot structure of FIG. 4. In one configuration, the NES state of the network entity may refer to one or more of the power modes of FIG. 5.

At 804, the first UE may transmit sidelink transmission to a second UE using the resource selected based on the NES state of the network entity. For example, referring to FIG. 7, the first UE 702 may transmit, at 720, sidelink transmission to a second UE 706 using the resource selected based on the NES state of the network entity (base station 704).

In some aspects, the first UE may receive a configured grant of sidelink resources from the network entity; and deactivate or release at least a portion of the configured grant of sidelink resources in response to a change in the NES state of the network entity. For example, referring to FIG. 7, the first UE 702 may receive, at 708, a configured grant of sidelink resources from the network entity (base station 704). The first UE 702 may, at 716, deactivate or release at least a portion of the configured grant of sidelink resources in response to a change in the NES state of the network entity (base station 704).

In some aspects, the first UE may determine between the deactivating or releasing of at least a portion of the configured grant of sidelink resources in response to the change in the NES state of the network entity based on the type of the configured grant. For example, referring to FIG. 7, when the first UE 702 deactivates or releases at least a portion of the configured grant of sidelink resources at 716, the first UE 702 may determine whether to deactivate or release the at least a portion of the configured grant of sidelink resources based on the type of the configured grant the first UE 702 receives at 708.

In some aspects, the first UE may receive a configuration from the network entity. The configuration may indicate deactivating or releasing at least a portion of the configured grant of sidelink resources in response to the change in the NES state of the network entity. For example, referring to FIG. 7, the first UE 702 may receive, at 710, an indication from the network entity (base station 704). The indication may indicate deactivating or releasing at least a portion of the configured grant of sidelink resources the first UE 702 received at 708 in response to the change in the NES state of the network entity (base station 704).

In some aspects, the resource selected based on the NES state of the network entity may be a remaining portion of the configured grant of sidelink resources that is not deactivated or released. For example, referring to FIG. 7, the resource the first UE 702 selected based on the NES state of the network entity (base station 704), at 718, may be a remaining portion of the configured grant of sidelink resources that is not deactivated or released at 716.

In some aspects, the deactivated or released portion of the configured grant of sidelink resources may be determined based on one or more of: an indication from the network entity through RRC; a periodicity of the configured grant; and a priority of the sidelink transmission. For example, referring to FIG. 7, when the first UE 702 deactivates or releases, at 716, at least a portion of the configured grant of sidelink resources, the deactivated or released portion of the configured grant of sidelink resources may be determined based on one or more of: an indication from the network entity (base station 704) through RRC; a periodicity of the configured grant the first UE 702 received at 708; and a priority of the sidelink transmission (720).

In some aspects, the deactivated or released portion of the configured grant of sidelink resources may be determined based on the periodicity of the configured grant being higher than a periodicity threshold. For example, referring to FIG. 7, when the first UE 702 deactivates or releases at least a portion of the configured grant of sidelink resources at 716, the deactivated or released portion of the configured grant of sidelink resources (which the first UE 702 received at 708) may be determined based on the periodicity of the configured grant being higher than a periodicity threshold.

In some aspects, the first UE may receive an indication of the periodicity threshold from the network entity. For example, referring to FIG. 7, the first UE 702 may receive, at 712, an indication of the periodicity threshold from the network entity (base station 704).

In some aspects, the first UE may receive, from the network entity, multiple resource allocations respectively corresponding to multiple NES states including a previous NES state and a current NES state. To select the resource for the sidelink transmission, the first UE may, in response to the network entity switching from the previous NES state to the current NES state, exclude a first set of resources associated with a first resource allocation associated with the previous NES state, and select the resources from a second resource allocation associated with the current NES state of the network entity. For example, referring to FIG. 7, the first UE may receive from the network entity (base station 704) multiple resource allocations respectively corresponding to multiple NES states of the network entity (base station 704). The multiple NES states may include a previous NES state and a current NES state. To select, at 718, the resource for the sidelink transmission (720), the first UE 702 may, in response to the network entity (base station 704) switching from the previous NES state to the current NES state, exclude a first set of resources associated with a first resource allocation associated with the previous NES state, and select the resources from a second resource allocation associated with the current NES state of the network entity (base station 704).

In some aspects, the plurality of resource allocations may include a plurality of configured grants. For example, referring to FIG. 7, the plurality of resource allocations the first UE 702 received may include a plurality of configured grants.

In some aspects, the first UE may receive, from the network entity, an initial configured grant configuration and multiple adaptation configurations indicating an adjustment to configuration parameters in the initial configured grant configuration. Each adaptation configuration may correspond to one NES state of multiple NES states of the network entity. To transmit the sidelink transmission using the resource selected based on the NES state of the network entity, the first UE may transmit the sidelink transmission based on the initial configured grant configuration and the adaptation configuration corresponding to the NES state. For example, referring to FIG. 7, the first UE may receive, at 708, from the network entity (base station 704), an initial configured grant configuration. The first UE 702 may further receive multiple adaptation configurations indicating an adjustment to configuration parameters in the initial configured grant configuration the first UE 702 received at 708. Each adaptation configuration may correspond to one NES state of multiple NES states of the network entity (base station 704). To transmit, at 720, the sidelink transmission using the resource selected based on the NES state of the network entity (base station 704), the first UE 702 may transmit, at 720, the sidelink transmission based on the initial configured grant configuration and the adaptation configuration corresponding to the NES state (base station 704).

In some aspects, the configuration parameters may include one or more of: the transmission power for the sidelink transmission, and the MCS of the sidelink transmission. For example, referring to FIG. 7, the configuration parameters may include one or more of: the transmission power for the sidelink transmission (720), and an MCS of the sidelink transmission (720).

In some aspects, the first UE may provide or skip feedback for sidelink communication to the network entity based on the NES state of the network entity. For example, referring to FIG. 7, based on the NES state of the network entity (base station 704), the first UE 702 may provide, at 722, feedback for sidelink communication to the network entity (base station 704), or skip, at 724, the feedback for sidelink communication to the network entity (base station 704).

In some aspects, to provide the feedback for sidelink communication, the first UE may transmit HARQ-ACK feedback for the sidelink communication to the network entity in response to the NES state being a receiving state. To skip the feedback for sidelink communication, the first UE may skip the feedback to the network entity in response to the NES state being a non-receiving state. For example, referring to FIG. 7, to provide the feedback for sidelink communication, at 722, the first UE 702 may transmit, at 722, HARQ-ACK feedback for the sidelink communication to the network entity (base station 704) in response to the NES state being a receiving state.

To skip, at 724, the feedback for sidelink communication, the first UE 702, may skip, at 724, the feedback to the network entity in response to the NES state being a non-receiving state.

In some aspects, the first UE may transmit, in response to the network entity switching from the non-receiving state into the receiving state, deferred feedback regarding the sidelink communication of the first UE. For example, referring to FIG. 7, if the first UE 702 skipped the feedback for the sideline communication at 724, the first UE 702 may transmit, in response to the network entity switching from the non-receiving state into the receiving state, deferred feedback regarding the sidelink communication (720) of the first UE 702 to the network entity (base station 704).

In some aspects, the first UE may transmit the deferred feedback if a deferred amount of the deferred feedback is shorter than a deferral threshold. For example, referring to FIG. 7, when the first UE 702 transmits the deferred feedback at 726, the first UE 702 may transmit the deferred feedback if a deferred amount of the deferred feedback is shorter than a deferral threshold. The first UE 702 may receive the deferral threshold from the network entity (base station 704) at 714.

In some aspects, the first UE may skip monitoring for DCI allocating resources for sidelink communication based on the NES state of the network entity. For example, referring to FIG. 7, when the first UE 702 may skip monitoring for DCI allocating resources for sidelink communication (720) based on the NES state of the network entity (base station 704).

Figure 9:
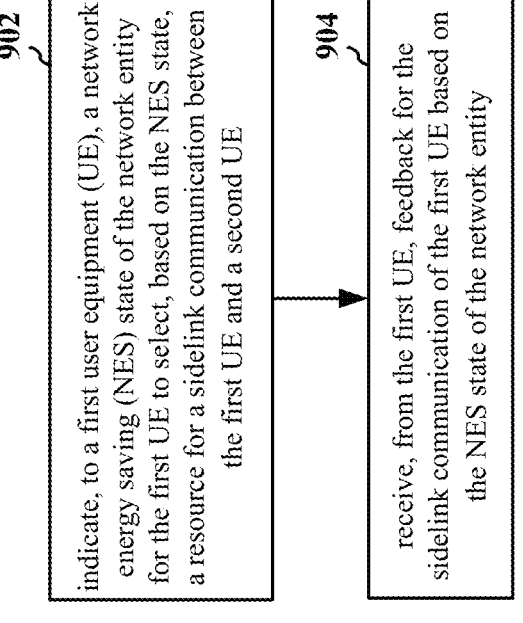
FIG. 9 is a flowchart illustrating methods of wireless communication at a network entity in accordance with various aspects of the present disclosure.

FIG. 9 is a flowchart 900 illustrating methods of wireless communication at a network entity in accordance with various aspects of the present disclosure. The method may be performed by a network entity. The network entity may be a base station, or a component of a base station, in the access network of FIG. 1 or a core network component (e.g., base station 102, 704; wireless device 310; or the network entity 1002 in the hardware implementation of FIG. 10). The method enables adaptive sidelink resource allocation and configuration in different NES states of the base station. It improves the energy efficiency of wireless communication.

As shown in FIG. 9, at 902, the network entity may indicate, to a first UE, an NES state of the network entity for the first UE to select, based on the NES state, a resource for a sidelink communication between the first UE and a second UE. The UE may be the UE 104, 702; wireless device 350; or the apparatus 1004 in the hardware implementation of FIG. 10. FIGS. 4, 5, 7 illustrate various aspects of the steps in connection with flowchart 900. For example, referring to FIG. 7, the network entity (base station 704) may indicate, at 715, to a first UE 702, an NES state of the network entity (base station 704) for the first UE 702 to select, at 718, based on the NES state, a resource for a sidelink communication (720) between the first UE 702 and a second UE 706. In one configuration, the resource for the sidelink transmission may refer to the frequency domain resource and time domain resource illustrated by the slot structure of FIG. 4. In one configuration, the NES state of the network entity may refer to one or more of the power modes of FIG. 5.

At 904, the network entity may receive, from the first UE, feedback for the sidelink communication of the first UE based on the NES state of the network entity. For example, referring to FIG. 7, the network entity (base station 704) may receive, at 722, from the first UE 702, feedback for the sidelink communication (720) of the first UE 702 based on the NES state of the network entity (base station 704).

In some aspects, the network entity may transmit, to the first UE, a configured grant of sidelink resources for the sidelink communication. At least a portion of the configured grant of sidelink resources may be configured to be deactivated or released in response to a change of the NES state of the network entity. For example, referring to FIG. 7, the network entity (base station 704) may transmit, at 708, to the first UE 702, a configured grant of sidelink resources for the sidelink communication (720). At least a portion of the configured grant of sidelink resources may be configured to be deactivated or released, at 716, in response to a change of the NES state of the network entity (base station 704).

In some aspects, the network entity may transmit, to the first UE, a configuration indicating the first UE to deactivate or release, according to the change of the NES state of the network entity, the at least a portion of the configured grant of sidelink resources. For example, referring to FIG. 7, the network entity (base station 704) may transmit, at 710, to the first UE 702, an indication indicating the first UE 702 to deactivate or release, at 716, according to the change of the NES state of the network entity (base station 704), the at least a portion of the configured grant of sidelink resources.

In some aspects, the deactivated or released portion of the configured grant of sidelink resources is determined based on one or more of: an indication from the network entity through RRC; a periodicity of the configured grant; and a priority of sidelink information. For example, referring to FIG. 7, when the first UE 702 deactivates or releases, at 716, at least a portion of the configured grant of sidelink resources, the deactivated or released portion of the configured grant of sidelink resources may be determined based on one or more of: an indication from the network entity (base station 704) through RRC; a periodicity of the configured grant the first UE 702 received at 708; and a priority of the sidelink transmission (720).

In some aspects, the network entity may indicate, to the first UE, the periodicity threshold for the first UE to determine the portion of the configured grant to be deactivated or released according to the NES state of the network entity. For example, referring to FIG. 7, the network entity (base station 704) may indicate, at 712, to the first UE 702, the periodicity threshold for the first UE 702 to determine the portion of the configured grant to be deactivated or released according to the NES state of the network entity (base station 704).

In some aspects, the network entity may transmit, to the first UE, multiple configured grants for sidelink communication respectively corresponding to multiple NES states including a previous NES state and a current NES state. For example, referring to FIG. 7, the network entity (base station 704) may transmit, at, for example, 708, to the first UE 702, multiple configured grants for sidelink communication (720)

respectively corresponding to multiple NES states including a previous NES state and a current NES state.

In some aspects, the network entity may transmit, to the first UE, an initial configured grant for sidelink communication and multiple adaptation configurations indicating an adjustment to configuration parameters in the initial configured grant. Each adaptation configuration may correspond to one NES state of multiple NES states of the network entity. For example, referring to FIG. 7, the network entity (base station 704) may transmit, at, for example, 708, to the first UE 702, an initial configured grant for sidelink communication (720) and multiple adaptation configurations indicating an adjustment to configuration parameters in the initial configured grant. Each adaptation configuration may correspond to one NES state of multiple NES states of the network entity (base station 704).

In some aspects, the configuration parameters may include one or more of: the transmission power for the sidelink communication, and the MCS for the sidelink communication. For example, referring to FIG. 7, when the network entity (base station 704) transmits, at, for example, 708, the initial configured grant for sidelink communication (720) and multiple adaptation configurations indicating an adjustment to configuration parameters in the initial configured grant to the first UE 702, the configuration parameters may include one or more of: the transmission power for the sidelink communication (720), and the MCS for the sidelink communication (720).

In some aspects, to receive the feedback for the sidelink communication of the first UE, the network entity may receive, from the first UE, in response to the NES state being a receiving state, HARQ-ACK feedback associated with the sidelink communication. For example, referring to FIG. 7, when the network entity (base station 704) receives the feedback for the sidelink communication (720) of the first UE 702, the network entity (base station 704) may receive, at 722, from the first UE 702, in response to the NES state being a receiving state, HARQ-ACK feedback associated with the sidelink communication (720).

In some aspects, to receive the feedback for the sidelink communication of the first UE, the network entity may receive, from the first UE, in response to the network entity switching from a non-receiving state into a receiving state, deferred feedback regarding the sidelink communication of the first UE. For example, referring to FIG. 7, if the first UE 702 skips, at 724, the feedback for the sidelink communication (720), the network entity (base station 704) may receive, at 726, from the first UE 702, deferred feedback regarding the sidelink communication (720) of the first UE 702 in response to the network entity (base station 704) switching from a non-receiving state into a receiving state.

In some aspects, the network entity may transmit, to the first UE, through RRC, the deferral threshold for the deferred feedback. The deferred amount of the deferred feedback may be shorter than the deferral threshold. For example, referring to FIG. 7, the network entity (base station 704) may transmit, at 714, to the first UE 702, through RRC, the deferral threshold for the deferred feedback. The deferred amount of the deferred feedback the network entity (base station 704) receives, at 726, may be shorter than the deferral threshold.

Figure 10:
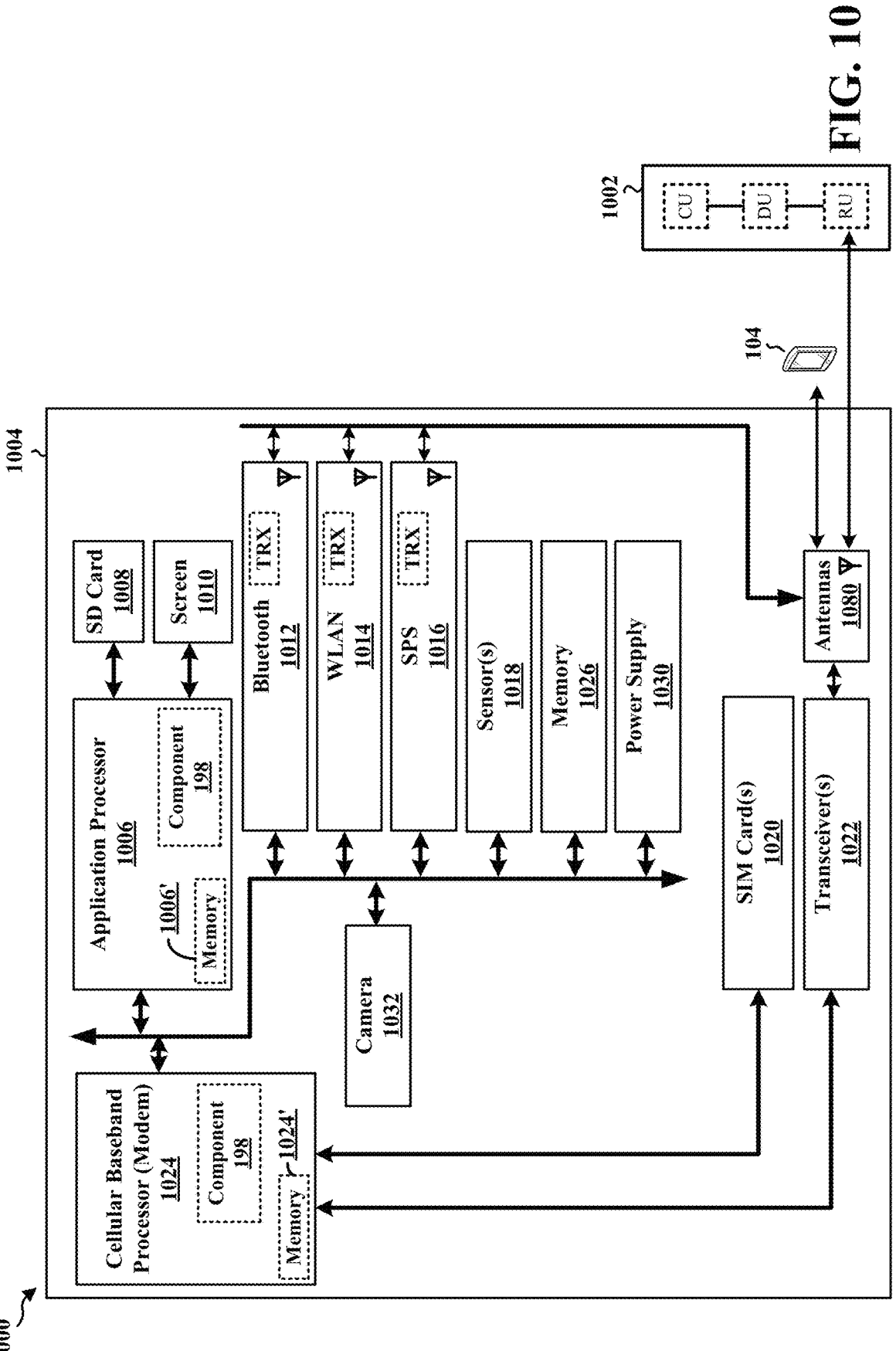
FIG. 10 is a diagram illustrating an example of a hardware implementation for an example apparatus and/or network entity.

FIG. 10 is a diagram 1000 illustrating an example of a hardware implementation for an apparatus 1004. The apparatus 1004 may be a UE, a component of a UE, or may implement UE functionality. In some aspects, the apparatus 1004 may include a cellular baseband processor 1024 (also referred to as a modem) coupled to one or more transceivers 1022 (e.g., cellular RF transceiver). The cellular baseband processor 1024 may include on-chip memory 1024'. In some aspects, the apparatus 1004 may further include one or more subscriber identity modules (SIM) cards 1020 and an application processor 1006 coupled to a secure digital (SD) card 1008 and a screen 1010. The application processor 1006 may include on-chip memory 1006'. In some aspects, the apparatus 1004 may further include a Bluetooth module 1012, a WLAN module 1014, an SPS module 1016 (e.g., GNSS module), one or more sensor modules 1018 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1026, a power supply 1030, and/or a camera 1032. The Bluetooth module 1012, the WLAN module 1014, and the SPS module 1016 may include an on-chip transceiver (TRX) (or in some cases, just a receiver (RX)). The Bluetooth module 1012, the WLAN module 1014, and the SPS module 1016 may include their own dedicated antennas and/or utilize the antennas 1080 for communication. The cellular baseband processor 1024 communicates through the transceiver(s) 1022 via one or more antennas 1080 with the UE 104 and/or with an RU associated with a network entity 1002. The cellular baseband processor 1024 and the application processor 1006 may each include a computer-readable medium/memory 1024', 1006', respectively. The additional memory modules 1026 may also be considered a computer-readable medium/memory. Each computer-readable medium/memory 1024', 1006', 1026 may be non-transitory. The cellular baseband processor 1024 and the application processor 1006 are each responsible for general processing, including the execution of software stored on the computer-readable medium/memory. The software, when executed by the cellular baseband processor 1024/application processor 1006, causes the cellular baseband processor 1024/application processor 1006 to perform the various functions described supra. The computer-readable medium/memory may also be used for storing data that is manipulated by the cellular baseband processor 1024/application processor 1006 when executing software. The cellular baseband processor 1024/application processor 1006 may be a component of the UE and may include the memory 360 and/or at least one of the TX processor 368, the RX processor 356, and the controller/processor 359. In one configuration, the apparatus 1004 may be a processor chip (modem and/or application) and include just the cellular baseband processor 1024 and/or the application processor 1006, and in another configuration, the apparatus 1004 may be the entire UE (e.g., see 350 of FIG. 3) and include the additional modules of the apparatus 1004.

As discussed supra, the component 198 is configured to select a resource for a sidelink transmission based on an NES state of a network entity communicating with the component 198; and transmit sidelink transmission to a second UE using the resource selected based on the NES state of the network entity. The component 198 may be further configured to perform any of the aspects described in connection with the flowchart in FIG. 8, and/or performed by the UE 702 in FIG. 7. The component 198 may be within the cellular baseband processor 1024, the application processor 1006, or both the cellular baseband processor 1024 and the application processor 1006. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1004 may include a variety of components configured for various functions. In one configuration, the apparatus 1004, and in particular the cellular baseband processor 1024 and/or the application processor 1006, includes means for selecting a resource for a sidelink transmission based on an NES state of a network entity communicating with the apparatus 1004. The apparatus 1004 may further include means for transmitting sidelink transmission to a second UE using the resource selected based on the NES state of the network entity. The apparatus 1004 may further include means for performing any of the aspects described in connection with the flowchart in FIG. 8, and/or aspects performed by the UE 702 in FIG. 7. The means may be the component 198 of the apparatus 1004 configured to perform the functions recited by the means. As described supra, the apparatus 1004 may include the TX processor 368, the RX processor 356, and the controller/processor 359. As such, in one configuration, the means may be the TX processor 368, the RX processor 356, and/or the controller/processor 359 configured to perform the functions recited by the means.

Figure 11:
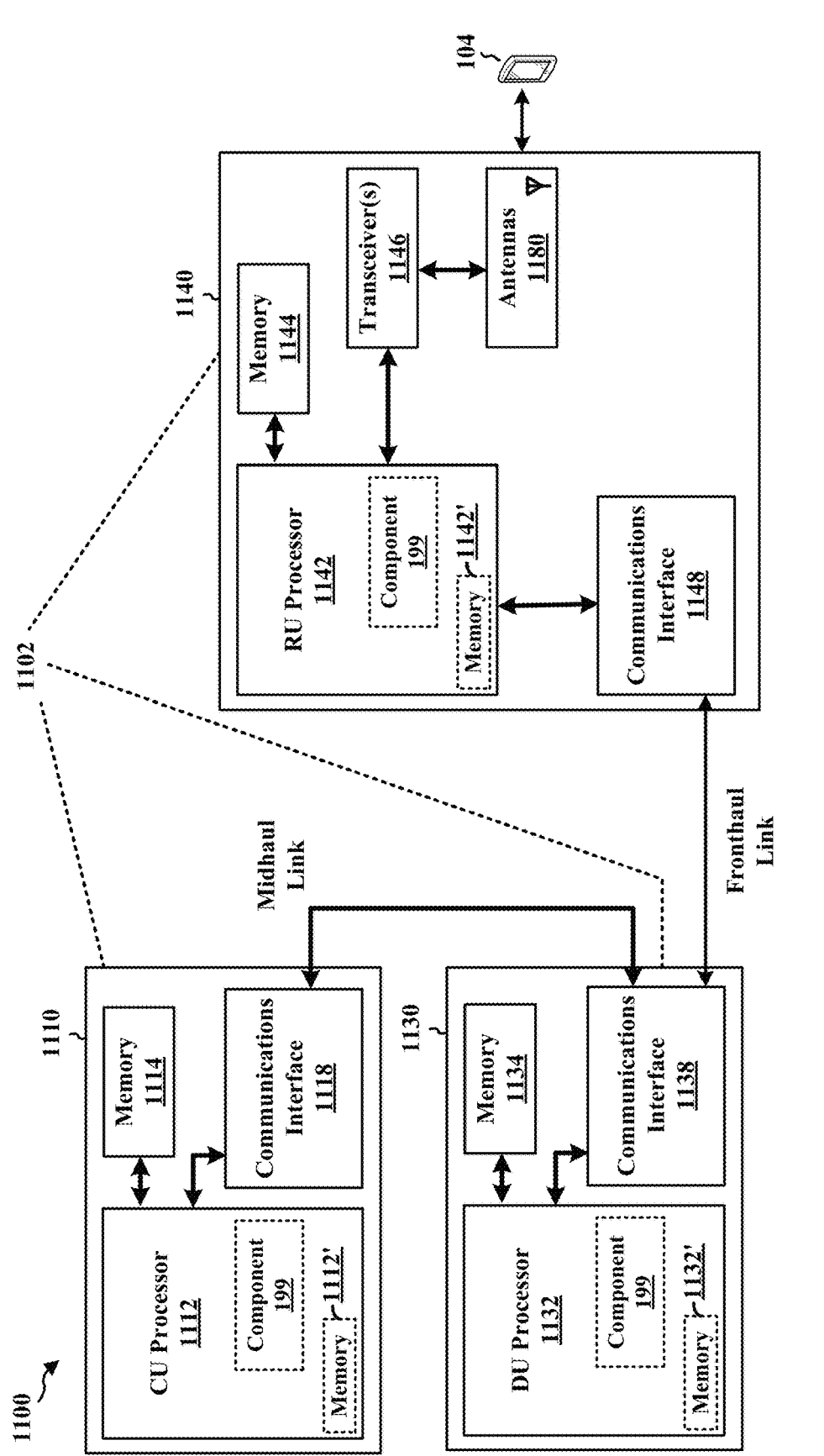
FIG. 11 is a diagram illustrating an example of a hardware implementation for an example network entity.

FIG. 11 is a diagram 1100 illustrating an example of a hardware implementation for a network entity 1102. The network entity 1102 may be a BS, a component of a BS, or may implement BS functionality. The network entity 1102 may include at least one of a CU 1110, a DU 1130, or an RU 1140. For example, depending on the layer functionality handled by the component 199, the network entity 1102 may include the CU 1110; both the CU 1110 and the DU 1130; each of the CU 1110, the DU 1130, and the RU 1140; the DU 1130; both the DU 1130 and the RU 1140; or the RU 1140. The CU 1110 may include a CU processor 1112. The CU processor 1112 may include on-chip memory 1112'. In some aspects, the CU 1110 may further include additional memory modules 1114 and a communications interface 1118. The CU 1110 communicates with the DU 1130 through a midhaul link, such as an F1 interface. The DU 1130 may include a DU processor 1132. The DU processor 1132 may include on-chip memory 1132'. In some aspects, the DU 1130 may further include additional memory modules 1134 and a communications interface 1138. The DU 1130 communicates with the RU 1140 through a fronthaul link. The RU 1140 may include an RU processor 1142. The RU processor 1142 may include on-chip memory 1142'. In some aspects, the RU 1140 may further include additional memory modules 1144, one or more transceivers 1146, antennas 1180, and a communications interface 1148. The RU 1140 communicates with the UE 104. The on-chip memory 1112', 1132', 1142' and the additional memory modules 1114, 1134, 1144 may each be considered a computer-readable medium/memory. Each computer-readable medium/memory may be non-transitory. Each of the processors 1112, 1132, 1142 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to indicate, to a UE, an NES state of the network entity for the first UE to select, based on the NES state, a resource for a sidelink communication between the first UE and a second UE; and receive, from the first UE, feedback for the sidelink communication of the first UE based on the NES state of the network entity. The component 199 may be further configured to perform any of the aspects described in connection with the flowchart in FIG. 9, and/or performed by the base station 704 in FIG. 7. The component 199 may be within one or more processors of one or more of the CU 1110, DU 1130, and the RU 1140. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1102 may include a variety of components configured for various functions. In one configuration, the network entity 1102 includes means for indicating, to a first UE, an NES state of the network entity for the first UE to select, based on the NES state, a resource for a sidelink communication between the first UE and a second UE, and means for receiving, from the first UE, feedback for the sidelink communication of the first UE based on the NES state of the network entity. The network entity 1102 may further include means for performing any of the aspects described in connection with the flowchart in FIG. 9, and/or aspects performed by the base station 704 in FIG. 7. The means may be the component 199 of the network entity 1102 configured to perform the functions recited by the means. As described supra, the network entity 1102 may include the TX processor 316, the RX processor 370, and the controller/processor 375. As such, in one configuration, the means may be the TX processor 316, the RX processor 370, and/or the controller/processor 375 configured to perform the functions recited by the means.

This disclosure provides a method for wireless communication at a first UE. The method may include selecting a resource for a sidelink transmission based on an NES state of a network entity communicating with the first UE; and transmitting sidelink transmission to a second UE using the resource selected based on the NES state of the network entity. The method enables adaptive sidelink resource allocation and configuration in different NES states of the base station. It improves the energy efficiency of wireless communication.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a first UE. The method includes selecting a resource for a sidelink transmission based on an NES state of a network entity communicating with the first UE; and transmitting sidelink transmission to a second UE using the resource selected based on the NES state of the network entity.

Aspect 2 is the method of aspect 1, where the method further includes: receiving, from the network entity, a configured grant of sidelink resources; and deactivating or releasing at least a portion of the configured grant of sidelink resources in response to a change in the NES state of the network entity.

Aspect 3 is the method of aspect 2, where the method includes: determining between the deactivating or releasing of at least a portion of the configured grant of sidelink resources in response to the change in the NES state of the network entity based on the type of the configured grant.

Aspect 4 is the method of any of aspects 1 or 2, where the method includes receiving a configuration from the network entity. The configuration may indicate deactivating or releasing at least a portion of the configured grant of sidelink resources in response to the change in the NES state of the network entity.

Aspect 5 is the method any of aspects 2 to 4, where the resource selected based on the NES state of the network entity is a remaining portion of the configured grant of sidelink resources that is not deactivated or released.

Aspect 6 is the method of any of aspects 2 to 5, where the deactivated or released portion of the configured grant of sidelink resources is determined based on one or more of: an indication from the network entity through RRC; a periodicity of the configured grant; and a priority of the sidelink transmission.

Aspect 7 is the method of any of aspects 2 to 6, where the deactivated or released portion of the configured grant of sidelink resources is determined based on the periodicity of the configured grant being higher than the periodicity threshold.

Aspect 8 is the method of aspect 7, where the method further includes: receiving an indication of the periodicity threshold from the network entity.

Aspect 9 is the method of aspect 1, where the method further includes: receiving, from the network entity, a plurality of resource allocations. The plurality of resource allocations respectively corresponds to a plurality of NES states including a previous NES state and a current NES state. And selecting the resource for the sidelink transmission includes: in response to the network entity switching from the previous NES state to the current NES state, excluding a first set of resources associated with a first resource allocation associated with the previous NES state, and selecting the resources from a second resource allocation associated with the current NES state of the network entity.

Aspect 10 is the method of aspect 9, where the plurality of resource allocations includes a plurality of configured grants.

Aspect 11 is the method of aspect 1, where the method further includes: receiving, from the network entity, an initial configured grant configuration and a plurality of adaptation configurations indicating an adjustment to configuration parameters in the initial configured grant configuration. Each adaptation configuration corresponds to one NES state of a plurality of NES states. And transmitting the sidelink transmission using the resource selected based on the NES state of the network entity includes: transmitting the sidelink transmission based on the initial configured grant configuration and the adaptation configuration corresponding to the NES state.

Aspect 12 is the method of aspect 11, where the configuration parameters include one or more of: a transmission power for the sidelink transmission, and an MCS of the sidelink transmission.

Aspect 13 is the method of any of aspects 1 to 12, where the method further includes: providing or skipping feedback for sidelink communication to the network entity based on the NES state of the network entity.

Aspect 14 is the method of aspect 13, where providing the feedback for sidelink communication includes: transmit HARQ-ACK feedback for the sidelink communication, to the network entity, in response to the NES state being a receiving state. And skipping the feedback for sidelink communication includes skipping the feedback to the network entity in response to the NES state being a non-receiving state.

Aspect 15 is the method of aspect 14, where the method further includes transmitting, in response to the network entity switching from the non-receiving state into the receiving state, deferred feedback regarding the sidelink communication of the first UE.

Aspect 16 is the method of aspect 15, where transmitting the deferred feedback includes: transmitting the deferred feedback if a deferred amount of the deferred feedback is shorter than a deferral threshold.

Aspect 17 is the method of any of aspects 1 to 16, where the method further includes: skipping monitoring for DCI allocating resources for sidelink communication based on the NES state of the network entity.

Aspect 18 is an apparatus for wireless communication at a first UE, including: a memory; and at least one processor coupled to the memory and, based at least in part on information stored in the memory, the at least one processor is configured to perform the method of any of aspects 1-17.

Aspect 19 is the apparatus of aspect 18, further including at least one of a transceiver or an antenna coupled to the at least one processor and configured to transmit sidelink transmission to a second UE.

Aspect 20 is an apparatus for wireless communication including means for implementing the method of any of aspects 1-17.

Aspect 21 is a computer-readable medium (e.g., a non-transitory computer-readable medium) storing computer executable code, where the code when executed by a processor causes the processor to implement the method of any of aspects 1-17.

Aspect 22 is a method of wireless communication at a network entity. The method includes: indicating, to a first UE, an NES state of the network entity for the first UE to select, based on the NES state, a resource for a sidelink communication between the first UE and a second UE; and receiving, from the first UE, feedback for the sidelink communication of the first UE based on the NES state of the network entity.

Aspect 23 is the method of aspect 22, where the method further includes: transmitting, to the first UE, a configured grant of sidelink resources for the sidelink communication. At least a portion of the configured grant of sidelink resources is configured to be deactivated or released in response to a change of the NES state of the network entity.

Aspect 24 is the method of aspect 23, where the method further includes: transmitting, to the first UE, a configuration indicating the first UE to deactivate or release, according to the change of the NES state of the network entity, the at least a portion of the configured grant of sidelink resources.

Aspect 25 is the method of aspect 23, where the deactivated or released portion of the configured grant of sidelink resources is determined based on one or more of: an indication from the network entity through RRC; a periodicity of the configured grant; and a priority of sidelink information.

Aspect 26 is the method of any of aspects 22 to 25, where the method further includes: indicating, to the first UE, a periodicity threshold for the first UE to determine the portion of the configured grant to be deactivated or released according to the NES state of the network entity.

Aspect 27 is the method of any of aspects 22 to 26, where the method further includes: wherein the at least one processor is further configured to: transmitting, to the first UE, a plurality of configured grants for sidelink communication respectively corresponding to a plurality of NES states including a previous NES state and a current NES state.

Aspect 28 is the method of any of aspects 22 to 26, where the method further includes: transmitting, to the first UE, an initial configured grant for sidelink communication and a plurality of adaptation configurations indicating an adjustment to configuration parameters in the initial configured grant. Each adaptation configuration corresponds to one NES state of a plurality of NES states.

Aspect 29 is the method of aspect 28, where the configuration parameters include one or more of: a transmission power for the sidelink communication, and an MCS for the sidelink communication.

Aspect 30 is the method of any of aspects 22 to 29, where receiving the feedback for the sidelink communication of the first UE includes: receiving, from the first UE, in response to the NES state being a receiving state, a HARQ-ACK feedback associated with the sidelink communication.

Aspect 31 is the method of any of aspects 22 to 29, where receiving the feedback for the sidelink communication of the first UE includes: receiving, from the first UE, in response to the network entity switching from a non-receiving state into a receiving state, deferred feedback regarding the sidelink communication of the first UE.

Aspect 32 is the method of aspect 31, where the method further includes: transmitting, to the first UE, through RRC, a deferral threshold for the deferred feedback. The deferred amount of the deferred feedback is shorter than the deferral threshold.

Aspect 33 is an apparatus for wireless communication at a network entity, including: a memory; and at least one processor coupled to the memory and, based at least in part on information stored in the memory, the at least one processor is configured to perform the method of any of aspects 22-32.

Aspect 34 is the apparatus of aspect 32, further including at least one of a transceiver or an antenna coupled to the at least one processor and configured to indicate the NES state of the network entity and to receive the feedback for the sidelink communication of the first UE.

Aspect 35 is an apparatus for wireless communication including means for implementing the method of any of aspects 22-32.

Aspect 36 is a computer-readable medium (e.g., a non-transitory computer-readable medium) storing computer executable code, where the code when executed by a processor causes the processor to implement the method of any of aspects 22-32.

What is claimed is:

1. An apparatus for wireless communication at a first user equipment (UE), comprising:
   memory; and
   at least one processor coupled to the memory and configured to:
   deactivate or release at least a portion of a configured grant of sidelink resources for a sidelink transmission in response to a change in a network energy-saving (NES) state of a network entity;
   select a resource for the sidelink transmission based on the NES state of the network entity communicating with the first UE; and
   transmit the sidelink transmission to a second UE using the resource selected based on the NES state of the network entity, wherein the resource selected based on the NES state of the network entity is a remaining portion of the configured grant of the sidelink resources that is not deactivated or released.

2. The apparatus of claim 1, further comprising:
   at least one transceiver coupled to the at least one processor and configured to transmit the sidelink transmission to the second UE using the resource selected based on the NES state of the network entity, wherein the at least one processor is further configured to:

receive, from the network entity, the configured grant of the sidelink resources.

3. The apparatus of claim 2, wherein the at least one processor is further configured to:

determine between the deactivating or releasing of at least the portion of the configured grant of the sidelink resources in response to the change in the NES state of the network entity based on a type of the configured grant.

4. The apparatus of claim 2, wherein the at least one processor is further configured to:

receive a configuration from the network entity, the configuration indicating to deactivate or release at least the portion of the configured grant of the sidelink resources in response to the change in the NES state of the network entity.

5. The apparatus of claim 2, wherein a deactivated or released portion of the configured grant of the sidelink resources is determined based on one or more of:

an indication from the network entity through radio resource control (RRC);

a periodicity of the configured grant; or a priority of the sidelink transmission.

6. The apparatus of claim 5, wherein the deactivated or released portion of the configured grant of the sidelink resources is determined based on the periodicity of the configured grant being higher than a periodicity threshold.

7. The apparatus of claim 6, wherein the at least one processor is further configured to:

receive a threshold indication of the periodicity threshold from the network entity.

8. The apparatus of claim 1, wherein the at least one processor is further configured to:

receive, from the network entity, a plurality of resource allocations, respectively corresponding to a plurality of NES states including a previous NES state and a current NES state, wherein, to select the resource for the sidelink transmission, the at least one processor is further configured to:

in response to the network entity switching from the previous NES state to the current NES state, exclude a first set of resources associated with a first resource allocation associated with the previous NES state, and select the resource from a second resource allocation associated with the current NES state of the network entity.

9. The apparatus of claim 8, wherein the plurality of resource allocations includes a plurality of configured grants.

10. An apparatus for wireless communication at a first user equipment (UE), comprising:

memory; and at least one processor coupled to the memory and configured to:

receive, from a network entity, an initial configured grant configuration and a plurality of adaptation configurations indicating an adjustment to configuration parameters in the initial configured grant configuration, each adaptation configuration corresponding to one network energy saving (NES) state of a plurality of NES states;

select a resource for a sidelink transmission based on the NES state of the network entity communicating with the first UE; and transmit the sidelink transmission to a second UE based on the initial configured grant configuration and an adaptation configuration corresponding to the NES state.

11. The apparatus of claim 10, wherein the configuration parameters include one or more of:

a transmission power for the sidelink transmission, or a modulation and coding scheme (MCS) of the sidelink transmission.

12. The apparatus of claim 1, wherein the at least one processor is further configured to:

provide or skip feedback for sidelink communication to the network entity based on the NES state of the network entity.

13. The apparatus of claim 12, wherein, to provide the feedback for the sidelink communication, the at least one processor is further configured to:

transmit hybrid automatic repeat request acknowledgment (HARQ-ACK) feedback for the sidelink communication, to the network entity, in response to the NES state being a receiving state, wherein, to skip the feedback for the sidelink communication, the at least one processor is configured to:

skip the feedback to the network entity in response to the NES state being a non-receiving state.

14. The apparatus of claim 13, wherein the at least one processor is further configured to:

transmit, in response to the network entity switching from the non-receiving state into the receiving state, deferred feedback regarding the sidelink communication of the first UE.

15. The apparatus of claim 14, wherein, to transmit the deferred feedback, the at least one processor is further configured to:

transmit the deferred feedback if a deferred amount of the deferred feedback is shorter than a deferral threshold.

16. The apparatus of claim 1, wherein the at least one processor is further configured to:

skip monitoring for downlink control information (DCI) allocating resources for sidelink communication based on the NES state of the network entity.

17. An apparatus for wireless communication at a network entity, comprising:

memory; and at least one processor coupled to the memory and configured to:

transmit, to a first user equipment (UE), a plurality of configured grants for a sidelink communication between the first UE and a second UE respectively corresponding to a plurality of network energy-saving (NES) states including a previous NES state and a current NES state;

indicate, to the first UE, a NES state of the network entity for the first UE to select, based on the NES state, a resource for the sidelink communication between the first UE and the second UE, wherein at least a portion of the configured grant of sidelink resources for the sidelink communication is configured to be deactivated or released in response to a change of the NES state of the network entity; and receive, from the first UE, feedback for the sidelink communication of the first UE based on the NES state of the network entity.

18. The apparatus of claim 17, further comprising:

at least one transceiver coupled to the at least one processor and configured to indicate the NES state of the network entity and to receive the feedback for the sidelink communication of the first UE, wherein the at least one processor is further configured to:

transmit, to the first UE, the configured grant of the sidelink resources for the sidelink communication.

19. The apparatus of claim 18, wherein the at least one processor is further configured to:

transmit, to the first UE, a configuration indicating the first UE to deactivate or release, according to the change of the NES state of the network entity, the at least the portion of the configured grant of the sidelink resources.

20. The apparatus of claim 18, wherein a deactivated or released portion of the configured grant of the sidelink resources is determined based on one or more of:

an indication from the network entity through radio resource control (RRC);

a periodicity of the configured grant; or a priority of sidelink information.

21. The apparatus of claim 20, wherein the at least one processor is further configured to:

indicate, to the first UE, a periodicity threshold for the first UE to determine the portion of the configured grant to be deactivated or released according to the NES state of the network entity.

22. An apparatus for wireless communication at a network entity, comprising:

memory; and at least one processor coupled to the memory and configured to:

transmit, to a first user equipment (UE), an initial configured grant for a sidelink communication and a plurality of adaptation configurations indicating an adjustment to configuration parameters in the initial configured grant, each adaptation configuration corresponding to one network energy saving (NES) state of a plurality of NES states of the network entity;

indicate, to the first UE, an NES state of the network entity for the first UE to select, based on the NES state, a resource for the sidelink communication between the first UE and a second UE; and receive, from the first UE, feedback for the sidelink communication of the first UE based on the NES state of the network entity.

23. The apparatus of claim 22, wherein the configuration parameters include one or more of:

a transmission power for the sidelink communication, or a modulation and coding scheme (MCS) for the sidelink communication.

24. The apparatus of claim 17, wherein, to receive the feedback for the sidelink communication of the first UE, the at least one processor is further configured to:

receive, from the first UE, in response to the NES state being a receiving state, a hybrid automatic repeat request acknowledgment (HARQ-ACK) feedback associated with the sidelink communication.

25. The apparatus of claim 17, wherein, to receive the feedback for the sidelink communication of the first UE, the at least one processor is further configured to:

receive, from the first UE, in response to the network entity switching from a non-receiving state into a receiving state, deferred feedback regarding the sidelink communication of the first UE.

26. The apparatus of claim 25, wherein the at least one processor is further configured to:

transmit, to the first UE, through RRC, a deferral threshold for the deferred feedback, wherein a deferred amount of the deferred feedback is shorter than the deferral threshold.

27. A method of wireless communication at a first user equipment (UE), comprising:

deactivating or releasing at least a portion of a configured grant of sidelink resources for a sidelink transmission in response to a change in a network energy-saving (NES) state of a network entity;

selecting a resource for the sidelink transmission based on the NES state of the network entity communicating with the first UE; and transmitting the sidelink transmission to a second UE using the resource selected based on the NES state of the network entity, wherein the resource selected based on the NES state of the network entity is a remaining portion of the configured grant of the sidelink resources that is not deactivated or released.

28. A method of wireless communication at a network entity, comprising:

transmit, to a first user equipment (UE), a plurality of configured grants for a sidelink communication between the first UE and a second UE respectively corresponding to a plurality of network energy-saving (NES) states including a previous NES state and a current NES state;

indicating, to the first UE, a NES state of the network entity for the first UE to select, based on the NES state, a resource for the sidelink communication between the first UE and the second UE, wherein at least a portion of the configured grant of sidelink resources for the sidelink communication is configured to be deactivated or released in response to a change of the NES state of the network entity; and receiving, from the first UE, feedback for the sidelink communication of the first UE based on the NES state of the network entity.

29. The apparatus of claim 1, wherein the at least one processor is further configured to:

receive, from the network entity, an initial configured grant configuration and a plurality of adaptation configurations indicating an adjustment to configuration parameters in the initial configured grant configuration, each adaptation configuration corresponding to one NES state of a plurality of NES states, wherein, to transmit the sidelink transmission using the resource selected based on the NES state of the network entity, the at least one processor is further configured to:

transmit the sidelink transmission based on the initial configured grant configuration and an adaptation configuration corresponding to the NES state.

30. The apparatus of claim 29, wherein the configuration parameters include one or more of:

a transmission power for the sidelink transmission, or a modulation and coding scheme (MCS) of the sidelink transmission.

* * * * *